Patented Sept. 11, 1923.

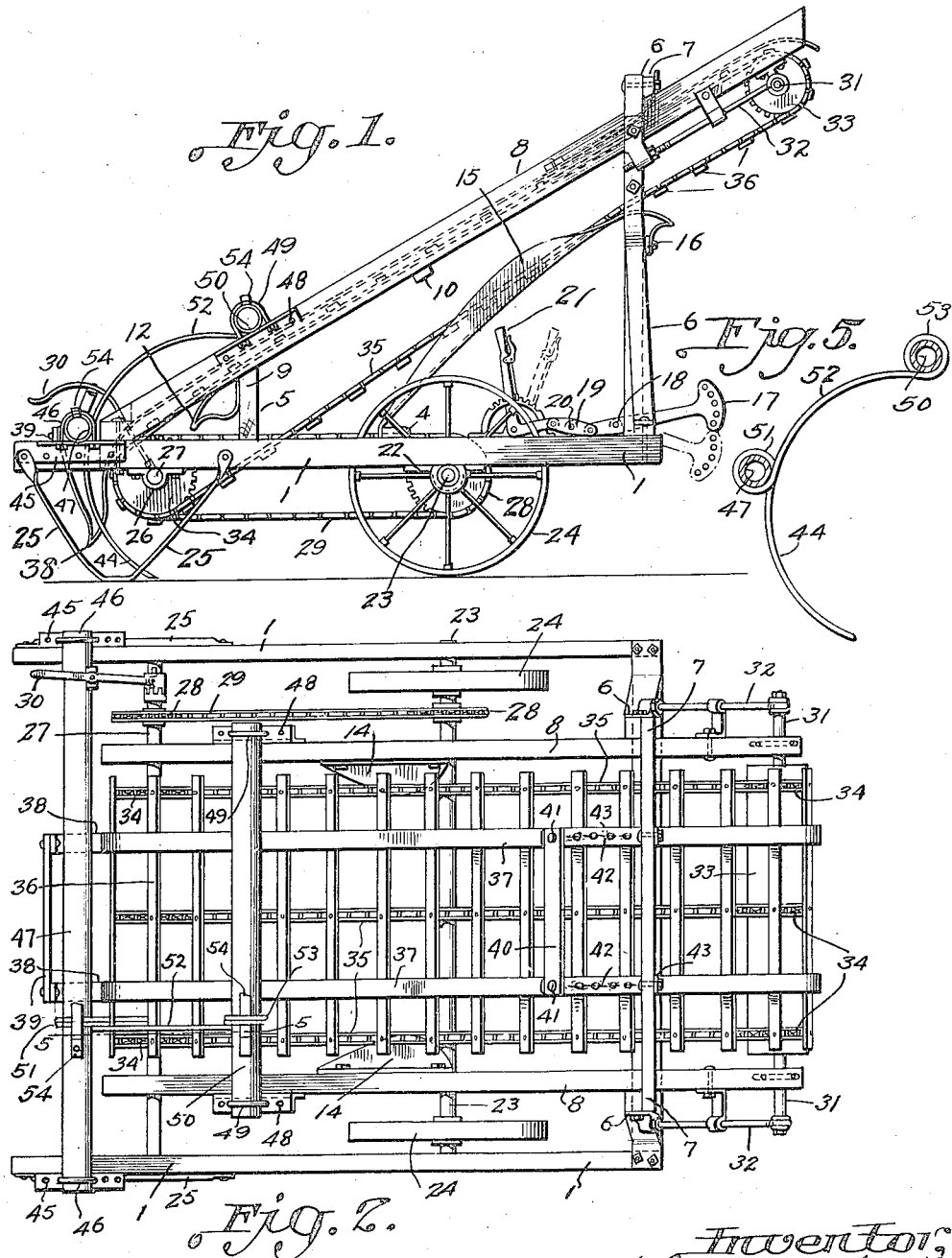

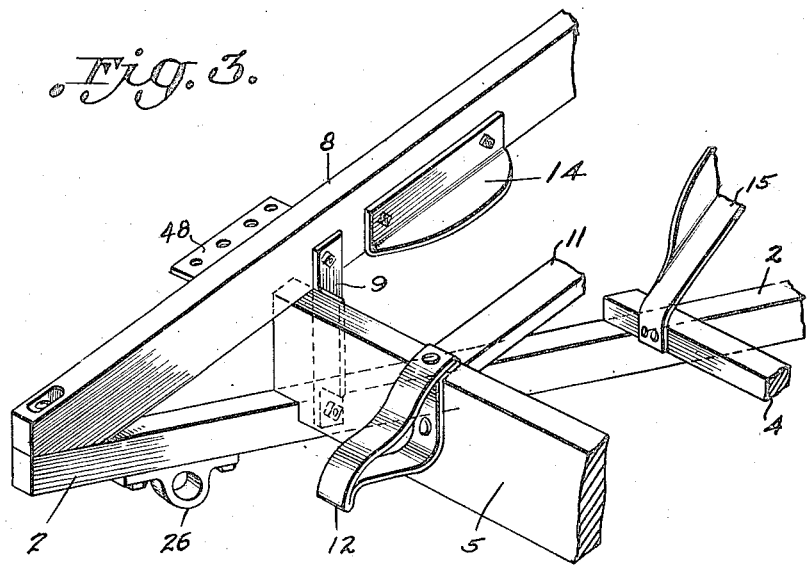
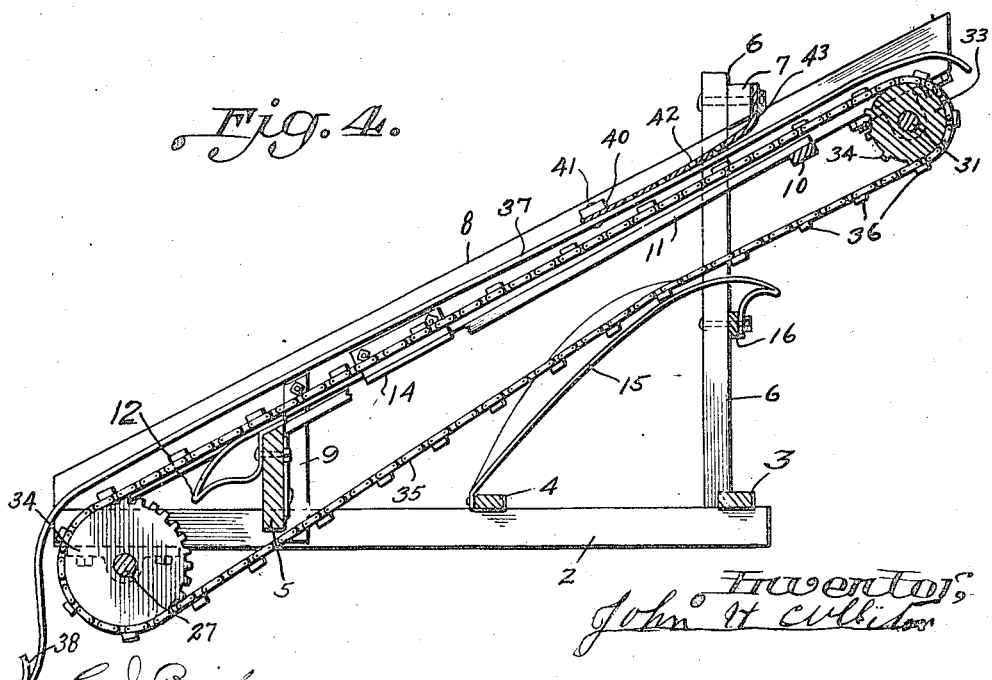

1,467,893

UNITED STATES PATENT OFFICE.

JOHN H. CULLITON, OF WASECA, MINNESOTA.

HAY RAKE AND LOADER.

Application filed June 2, 1919. Serial No. 301,335.

*To all whom it may concern:*

Be it known that I, JOHN H. CULLITON, a citizen of the United States, residing at Waseca, in the county of Waseca and State of Minnesota, have invented a new and useful Hay Rake and Loader, of which the following is a specification.

The device forming the subject matter of this application is a combined hay rake and loader, and the invention aims to improve the construction of the rake teeth and the load retainers, and to provide novel means whereby these mechanisms may be mounted, and adjusted with respect to the conveyor which carries the hay upwardly and forwardly.

It is within the province of the disclosure to improve generally and to enhance the utility of devices of that type to which the invention appertains.

Within the scope of what is claimed, a mechanic may work alterations in the specific structure delineated and described, without departing from the spirit of the invention or placing the utility of the invention in jeopardy.

In the accompanying drawings:—

Figure 1 shows, in side elevation, a device constructed in accordance with the invention;

Figure 2 is a top plan wherein parts have been omitted;

Figure 3 is a fragmental perspective view showing a portion of the frame work of the machine;

Figure 4 is a vertical longitudinal section wherein parts are omitted.

Figure 5 is a diagrammatic section taken on the line 5—5 of Figure 2, parts being omitted.

The implement forming the subject matter of this application is wheel-mounted and embodies, therefore, a truck, which, within limits, may be constructed as desired. The truck includes a frame made up of outer sills 1 and inner sills 2, the sills 1 and 2 being parallel, and the sills 2 being somewhat shorter than the sills 1. At the forward end of the truck, the sills 2 and 1 are connected by a cross beam 3. The sills 2 are connected by a cross beam 4. A transverse brace or plate, shown best in Figure 3, and denoted by the numeral 5, connects the sills 2 relatively near to the rear ends thereof. Standards 6 are erected at the places of juncture between the cross beam 3 and the sills 2. At their upper ends, the standards 6 are connected by a cross beam 7. Downwardly and rearwardly inclined side bars 8 are shown, and are mounted on the sills 2, the brace 5 and the beam 7. The bars 8 form part of a conveyor frame. They may be connected to the sills 2 by straps 9, best shown in Figure 3. The side bars 8 are connected at intervals by transverse ties 10. The ties 10 and the transverse brace 5 carry longitudinal conveyor supports or strips 11.

A glance at the drawings will indicate that the machine embodies a belt conveyor, hereinafter described. For the direction and guidance of the conveyor, rearwardly extended guides 12 are mounted on the brace 5, the upper run of the conveyor being carried by the guides 12, and by guides 14 on the side bars 8. The cross beam 4 carries guides 15 for the lower run of the conveyor, these guides being connected at their forward ends to a bar 16 extended between the standards 6.

A draft connection 17 is provided and is fulcrumed at 18 on the truck frame, for vertical swinging adjustment, the rear end of the connection 17 being pivoted to one end of a lever 19, fulcrumed intermediate its ends, as at 20, on the frame, the other end of the lever 19 being pivoted to a bell crank or hand lever 21, provided with a common latch mechanism, and supported on the frame. But little attention need be given to the draft connection and attendant parts, since, per se, they constitute no part of the present invention. Let it suffice to say that the connection 17 may be adjusted or swung vertically, through the instrumentality of the hand lever 21.

There are bearings 22 on the truck frame, wherein an axle 23 is journaled. Ground wheels 24 are secured to the axle 23 and may be located inwardly of the sills 1. Shoes 25 are mounted on the rear ends of the sills 1, and at times cooperate with the ground wheels 24 in supporting the machine. The sills 1 and 2 are supplied with bearings 26 wherein a shaft 27 is journaled. Sprocket wheels 28 are mounted on the shaft 27 and on the axle 23 and receive a sprocket chain 29. Motion is transmitted from the axle 23 to the shaft 27 by way of the chain 29, and, to the end that the operator may control the rotation of the shaft 27, a lever-actuated clutch mechanism 30 is interposed therein.

A shaft 31 is supported for rotation at the forward ends of the side bars 8 and is under the control of belt tighteners 32. A cylindrical member 33 is mounted on the shaft 31. There are sprocket wheels 34 on the shaft 27 and on the member 33. The device includes a conveyor made up of chains 35 and slats 36 connecting the chains, the chains being engaged about the sprocket wheels 34 on the cylindrical member 33 and on the shaft 27. A glance at the drawings will render it evident that motion is transmitted to the conveyor from the axle 23 by way of the sprocket wheels 28, the chain 29, the shaft 27 and the sprocket wheels 34 on shaft 27.

In order to guide the load upon the conveyor, and to hold the load on the conveyor, retainers 37, in the form of spring strips, are provided, the strips extending longitudinally of the upper run of the conveyor. The retainers 37 have depending V-shaped ends 38, the upper extremities of which are connected by a cross piece 39. At a point midway between their ends, and nearer to their forward ends than to their rear ends, the retainers 37 are connected by a cross piece 40. Securing elements 41 unite the cross piece 40 with the retainers 37, the securing elements being adapted to be mounted in openings 42 formed in hangers 43, projecting rearwardly from the cross beam 7. A means thus is provided, whereby the retainers 37 may be adjusted lengthwise of the conveyor, so as to regulate the position of the ends 38 of the retainers, with respect to the rear portion of the conveyor, and with respect to the rake teeth 44, to be described in detail hereinafter, but one of the teeth being shown in the drawings. It may be noted, however, referring to Figure 1, that the elements 38 project slightly to the rear of the rake teeth 44. The teeth 44 collect the hay, the elements 38 directing the hay against the rear portion of the conveyor, and the retainers 37 holding the hay on the upper run of the conveyor. Since the retainers 37 and the parts 38 thereof are resilient, proper provision is made for variations in the amount of hay which is being raked up. If the crop is so heavy or so light that it is undesirable to rely alone on the resiliency of the parts 38 and 37, then the members 37 may be adjusted lengthwise of the conveyor, by shifting the securing elements 41 in the openings 42 of the hangers 43.

Angle brackets 45 are secured to the forward ends of the bars 1, and are supplied with a plurality of openings, receiving, for adjustment, U-bolts 46 retaining a rear rake bar 47, the construction being such that the rake bar may be adjusted longitudinally of the machine. Similar angle brackets 48 are secured to the bars 8, and receive, for adjustment, as above described, U-bolts 49, retaining a front rake bar 50. The rake teeth 44, hereinbefore alluded to, project downwardly and have a loop 51 engaged around the rear rake bar 47, the loop 51 being prolonged into an extension 52 having a loop 53 engaged around the forward bar 50. Retainers 54 are secured to the bars 50 and 47 and aid in holding the loops 53 and 51 thereon. It is clear that the bars 47 and 50 may be shifted longitudinally of the machine, to vary the position of the rake teeth 44 with respect to the rear portion of the conveyor, depending upon whether the crop is light or heavy. The extensions 52 prevent the loops 51 of the rake teeth from turning on the bar 47, and hold the teeth 44 in the depending positions shown in the drawing.

I claim:—

1. In a device of the class described, a truck embodying a frame; a conveyor traversing the frame; a retainer extended longitudinally of the conveyor and provided with a depending end located at the rear end of the conveyor; means under the control of an operator for securing the forward end of the retainer fixedly to the frame for adjustment, thereby to permit an adjustment of the depending end of the retainer with respect to the rear end of the conveyor; and teeth carried by the frame and depending at the rear end of the conveyor.

2. A device of the class described, constructed as set forth in claim 1, and further characterized by the provision of means for mounting the teeth at points spaced longitudinally of the frame, on the frame for sliding adjustment toward and away from the rear end of the conveyor.

3. A device of the class described, embodying a truck frame; a conveyor traversing the frame; front and rear bars extended transversely of the frame; means for securing the bars to the frame for adjustment longitudinally of the frame; and teeth located at the rear end of the conveyor, the teeth including loops engaged about the bars, and an extension connecting the loops.

4. A device of the class described, constructed as set forth in claim 3, and further characterized by the provision of a retainer extended longitudinally of the conveyor and having a depending end located at the rear end of the conveyor; and means for securing the forward end of the retainer to the frame for adjustment, thereby to permit an adjustment of the depending end of the retainer with respect to the rear end of the conveyor.

In testimony that I claim the foregoing as my own, I have hereto affixed my signature.

JOHN H. CULLITON.